United States Patent
Qian

(10) Patent No.: US 10,048,402 B2
(45) Date of Patent: Aug. 14, 2018

(54) DUAL-USE OR POSITION-SENSITIVE HELIUM-3 NEUTRON DETECTOR BY GAS GAIN MANIPULATION

(71) Applicant: Schlumberger Technology Corporation, Sugar Land, TX (US)

(72) Inventor: Jing Qian, Lawrenceville, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 51 days.

(21) Appl. No.: 15/387,003

(22) Filed: Dec. 21, 2016

(65) Prior Publication Data

US 2018/0172877 A1    Jun. 21, 2018

(51) Int. Cl.
*G01V 5/10*    (2006.01)

(52) U.S. Cl.
CPC .................. *G01V 5/107* (2013.01)

(58) Field of Classification Search
CPC ........................................ G01V 5/107
See application file for complete search history.

(56) References Cited

U.S. PATENT DOCUMENTS

| | | | | |
|---|---|---|---|---|
| 6,316,773 B1* | 11/2001 | Giakos | .................. | G01T 1/2935 250/370.01 |
| 2014/0097335 A1* | 4/2014 | Inanc | .................... | G01V 5/107 250/265 |
| 2015/0241577 A1* | 8/2015 | Spillane | .................. | G01T 3/008 250/391 |

OTHER PUBLICATIONS

Diane M. Markoff, Vince Cianciolo, Chuck L Britton, Ronald G. Cooper, Geoff L. Greene, Development of a Position Sensitive Neutron Detector with High Efficiency and Energy Resolution for Use at High-Flux Beam Sources, J. Res. Natl. Inst. Stand. Technol. 110, 449-452 (2005).
V. Radeka, N.A. Schaknowski, G.C. Smith and B. Yu, High Performance, Imaging, Thermal Neutron Detectors, 1998 Vienna Wire Chamber Conference, Feb. 23-27, 1998 (6 pages).
P. Sauli, The gas electron multiplier (GEM): Operating principles and applications, Nuclear Instruments and Methods in Physics Research A 805 (2016) pp. 2-24.
Thorwald Van Vuure, Thermal-neutron detection based on the Gas Electron Multiplier, Thesis for Ph.D., 2004, 122 pages.
[Wikipedia-PC] Proportional counter, http://en.wikipedia.org/wiki/Proportional_counter, 5 pages.

* cited by examiner

*Primary Examiner* — Hugh H Maupin
(74) *Attorney, Agent, or Firm* — Michael Dae

(57) ABSTRACT

A detector that detects properties of geological formation includes a first volume and a second volume each comprising Helium-3 gas. The detector includes a gas electron multiplier having a mesh plate disposed between the first volume and the second volume. The mesh plate creates an electric field that multiplies electrons of the second volume based on epithermal neutrons in the second volume. The detector includes at least one anode configured to receive electrons based on thermal neutrons in the first volume and epithermal neutrons in the second volume.

20 Claims, 12 Drawing Sheets

DUAL-USE OR POSITION-SENSITIVE HELIUM-3 NEUTRON DETECTOR BY GAS GAIN MANIPULATION

BACKGROUND

This disclosure relates to a neutron detector that distinguishes between epithermal and thermal neutrons or positions of incoming epithermal or thermal neutrons.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

To locate and extract resources from a well, a wellbore may be drilled into a geological formation. Downhole tools are placed into the wellbore to identify properties of the downhole environment. A downhole formation density tool, for example, may be deployed within the sub-surface to measure physical properties of a surrounding geological formation. The formation density tool may include a neutron source to emit neutrons into the geological formation. Some of the neutrons may interact with the geological formation and may then be detected by a neutron detector on the formation density tool. The physical properties of the geological formation and other materials of the downhole environment may be determined from the characteristics of the detected neutrons.

Different downhole tools may include various detectors to take different measurements of the geological formation. For example, a detector for thermal neutrons may include a Helium-3 tube having Helium-3 gas that reacts with thermal neutrons to cause electrons to be detected on an anode and cathode. When measuring epithermal neutrons, the Helium-3 tube may be wrapped in a layer of shielding that stops thermal neutrons from reaching the detector. That is, the detector may detect either thermal neutrons or epithermal neutrons, but not both. To take measurements of both would involve using multiple detectors or additional time wrapping/unwrapping a detector, thereby increasing costs or decreasing efficiency of downhole operations.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure allow both thermal neutrons and epithermal neutrons to be detected in a single detector (and/or to distinguish between the positions of incoming thermal or epithermal neutrons). For example, a Helium-3 detector may include a first volume and a second volume, each of which is filled with Helium-3 gas. Although Helium-3 is used as an example of a gas which may be used and this application refers to a Helium-3 tube, other gases that interact with neutrons may be used. The Helium-3 detector may include a gas electron multiplier (GEM) having a mesh plate disposed between the first volume and the second volume. The GEM may multiply electrons in the second volume based on epithermal neutrons in the second volume. The second volume of the detector may be shielded from thermal neutrons via a cadmium layer and Helium-3 gas of the first volume.

The detector may include at least one anode configured to receive electrons based on thermal neutrons in the first volume and epithermal neutrons in the second volume. Further, the detector may include detection circuitry configured to distinguish between epithermal and thermal neutrons. In some embodiments, the detection circuitry may measure epithermal and thermal neutrons in a single readout. By using the mesh plate, electrons from the epithermal neutrons in the second volume may undergo an electron avalanche while drifting to the anode such that each electron causes multiple electrons to drift to the anode. Further, by using various geometries of the detector, the type of incoming particles and position information may be determined.

In a first embodiment, a detector detects properties of geological formation. The detector includes a first volume and a second volume each comprising Helium-3 gas. The detector includes a gas electron multiplier (GEM) having a mesh plate disposed between the first volume and the second volume. The mesh plate creates an electric field that multiplies electrons of the second volume based on epithermal neutrons in the second volume. The detector includes at least one anode configured to receive electrons based on thermal neutrons in the first volume and epithermal neutrons in the second volume.

In a second embodiment, a method includes separating the first volume from a second volume via a mesh plate of a gas electron multiplier (GEM). The mesh plate may be disposed between the first volume and the second volume. The mesh plate creates an electric field that multiplies electrons of the second volume based on epithermal neutrons in the second volume. The method includes filling a first volume and a second volume with Helium-3 gas.

In a third embodiment, a downhole tool includes a detector having a first volume and a second volume, each of which include Helium-3 gas. The detector includes a gas electron multiplier (GEM) having a mesh plate disposed between the first volume and the second volume. The mesh plate creates an electric field that multiplies electrons of the second volume based on epithermal neutrons in the second volume. The detector includes at least one anode that receives electrons based on thermal neutrons in the first volume and epithermal neutrons in the second volume. The detector includes detection circuitry that receives an electrical signal via the anode indicative of the electrons.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
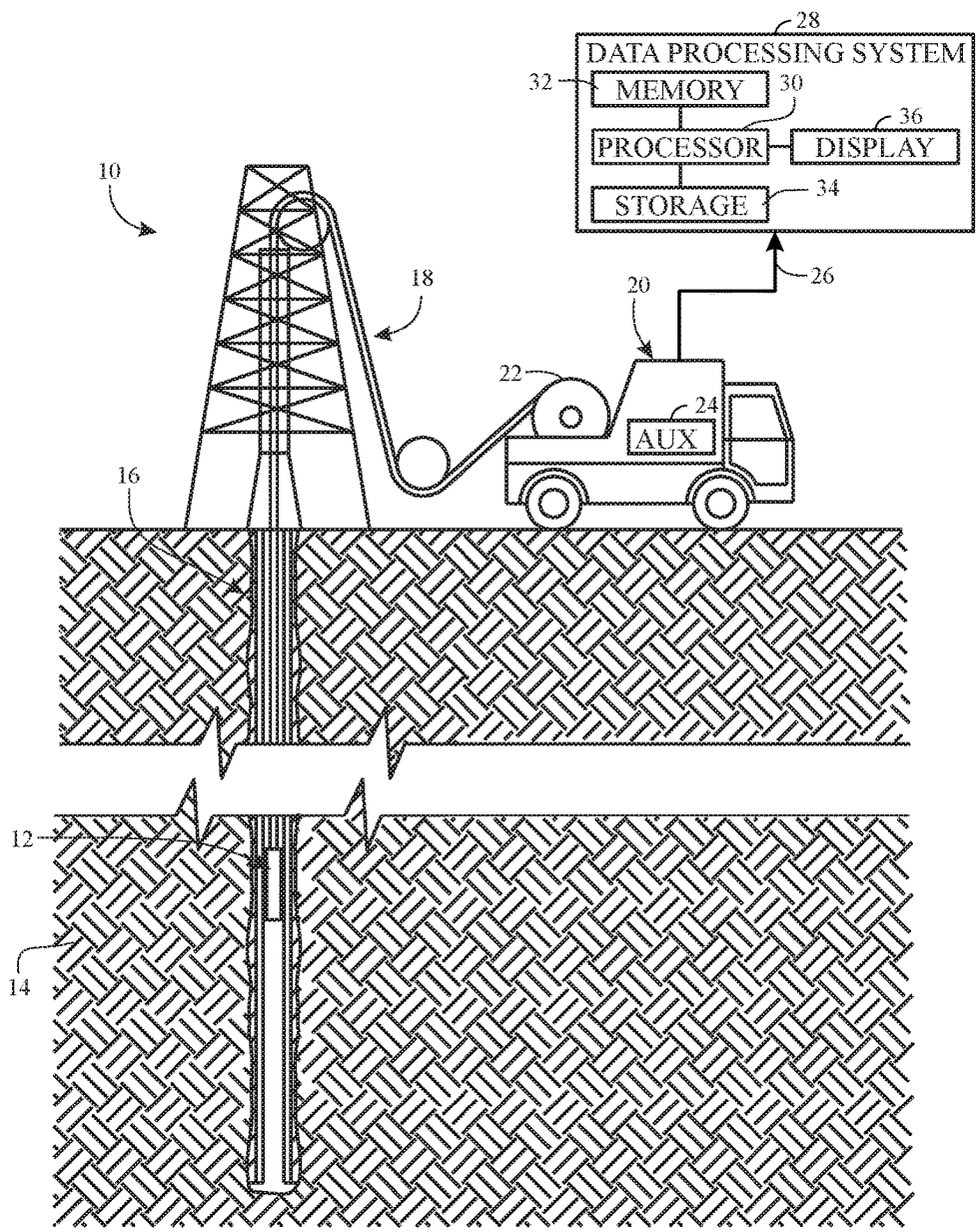
FIG. 1 is a schematic diagram of a drilling system that includes a downhole tool to detect properties of a geological formation adjacent to the downhole tool, in accordance with an embodiment.

One or more specific embodiments of the present disclosure will be described below. These described embodiments are examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Different downhole tools may be used for taking different measurements of the geological formation. For example, a detector for thermal neutrons may include a Helium-3 tube, an ionization chamber, or a proportional counter filled with Helium-3 gas or Helium-3 gas mixtures. In this detector, thermal neutrons are captured by Helium-3 via the reaction:

$$^{3}\text{He}+n\rightarrow{}^{3}\text{H}+p+764\text{ keV} \tag{1}$$

The reaction may produce ionized gas molecules (of Helium-3) and create electron and ion pairs. The electron and ion pairs may drift to an anode and cathode, respectively, when an electrostatic potential difference is applied between the cathode and the anode to form an electric field. Charges may be collected by the anode and cathode, and the detector may operate as an ionization chamber. If a stronger electric field is applied (than the electric field used as an ionization chamber), then gas multiplication may occur near the anode, and the detector operates such that charges collected may vary proportionally (e.g., logarithmically) to the voltage applied. The proportional counter mode may reduce pre-amp electronics, thereby improving the distinction between signal and noise. If wrapped by thermal neutron absorber or moderator or both, this detector technology may also be used to measure epithermal or fast neutrons. That is, the detector may be wrapped in a layer of shielding, such as cadmium, to stop thermal neutrons from reaching the detector. To measure both epithermal and thermal neutrons may involve using multiple detectors or additional time wrapping/unwrapping a detector. However, including additional detectors may increase costs and/or complexity of the downhole tool. Moreover, modifying the detector to detect either epithermal or thermal neutrons may take additional time, decreasing efficiency of downhole operations.

With this in mind, some embodiments of downhole tools described below may include a Helium-3 detector having a first volume and a second volume, each of which is filled with Helium-3 gas. The Helium-3 detector may include a gas electron multiplier (GEM) mesh plate disposed between the first volume and the second volume. The GEM mesh plate may multiply electrons in the second volume based on epithermal neutrons in the second volume. The second volume of the detector may be shielded from thermal neutrons via a cadmium layer and Helium-3 gas of the first volume.

With this in mind, FIG. 1 illustrates a well-logging system 10 that may employ the systems and methods of this disclosure. The well-logging system 10 may be used to convey a downhole tool 12 through a geological formation 14 via a wellbore 16. In the example of FIG. 1, the downhole tool 12 is conveyed on a cable 18 via a logging winch system (e.g., vehicle) 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20 and/or the downhole tool 12.

Moreover, while the downhole tool 12 is described as a wireline downhole tool, it should be appreciated that any suitable conveyance may be used. For example, the downhole tool 12 may instead be conveyed as a logging-while-drilling (LWD) tool as part of a bottom hole assembly (BHA) of a drill string, conveyed on a slickline or via coiled tubing, and so forth. For the purposes of this disclosure, the downhole tool 12 may be any suitable measurement tool that uses a detector to obtain measurements of properties of the geological formation 14.

As discussed further below, the downhole tool 12 may emit energy into the geological formation 14, which is detected by the downhole tool 12 as data 26 relating to the wellbore 16 and/or the geological formation 14. The data 26 may be sent to a data processing system 28. The data processing system 28 may be any electronic data processing system that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be read-only memory (ROM), random-access memory (RAM), flash memory, an optical storage medium, or a hard disk drive, to name a few examples. A display 36, which may be any suitable electronic display, may display the images generated by the processor 30. The data processing system 28 may be a local component of the logging winch system 20 (e.g., within the downhole tool 12), a remote device that analyzes data from other logging winch systems 20, a device located proximate to the drilling operation, or any combination thereof. In some embodiments, the data processing system 28 may be a mobile computing device (e.g., tablet, smart phone, or laptop) or a server remote from the logging winch system 20.

Figure 2:
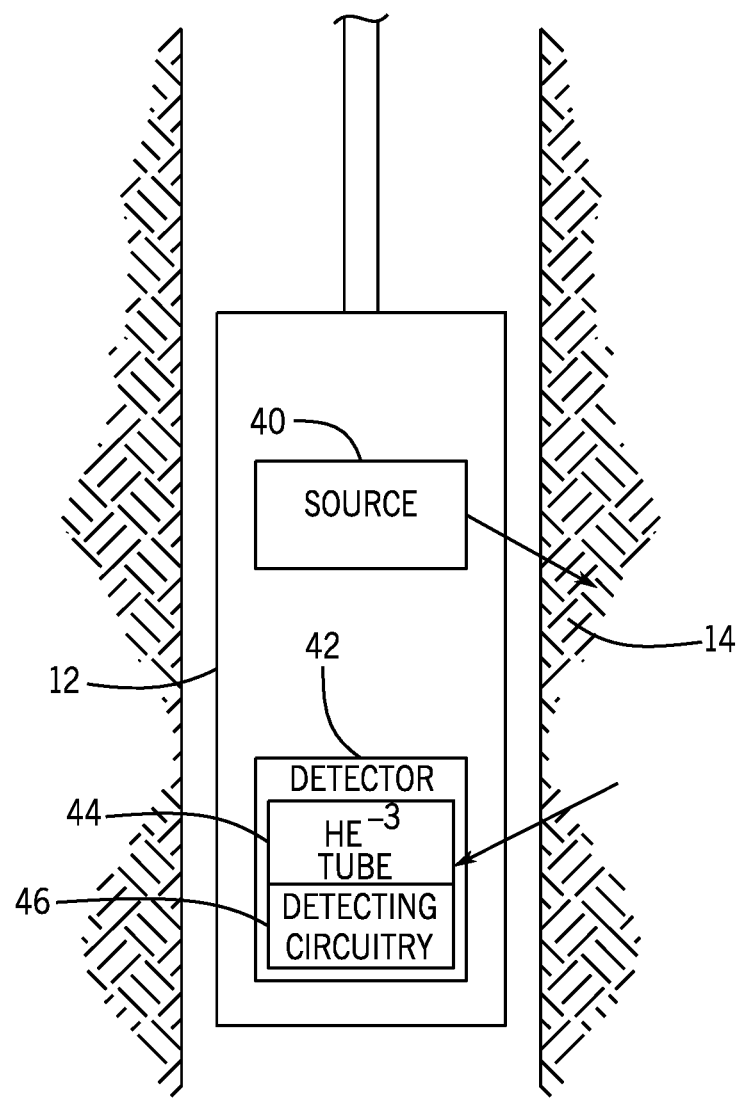
FIG. 2 is a block diagram of the downhole tool of FIG. 1 that includes a detector having a Helium-3 tube and detection circuitry, in accordance with an embodiment.

FIG. 2 is a block diagram of the downhole tool 12 that obtains measurements of properties of the geological formation. The downhole tool 12 may include a neutron source 40, such as a pulsed neutron generator (PNG), which emits neutrons, such as epithermal and/or thermal neutrons, into the geological formation 14. The downhole tool 12 may include a detector 42 having a Helium-3 tube 44 and detection circuitry 46. Some of the epithermal and/or thermal neutrons may interact with the geological formation 14 and be detected by the detector 42. For example, thermal neutrons may enter the Helium-3 tube 44 and cause the reaction described above, resulting in electrons drifting to an anode of the detector 42. The detection circuitry 46 may then measure signal(s) detected by the detector 42. Further, the detection circuitry 46 may perform a single readout indicative of both epithermal and thermal neutrons.

Figure 3:
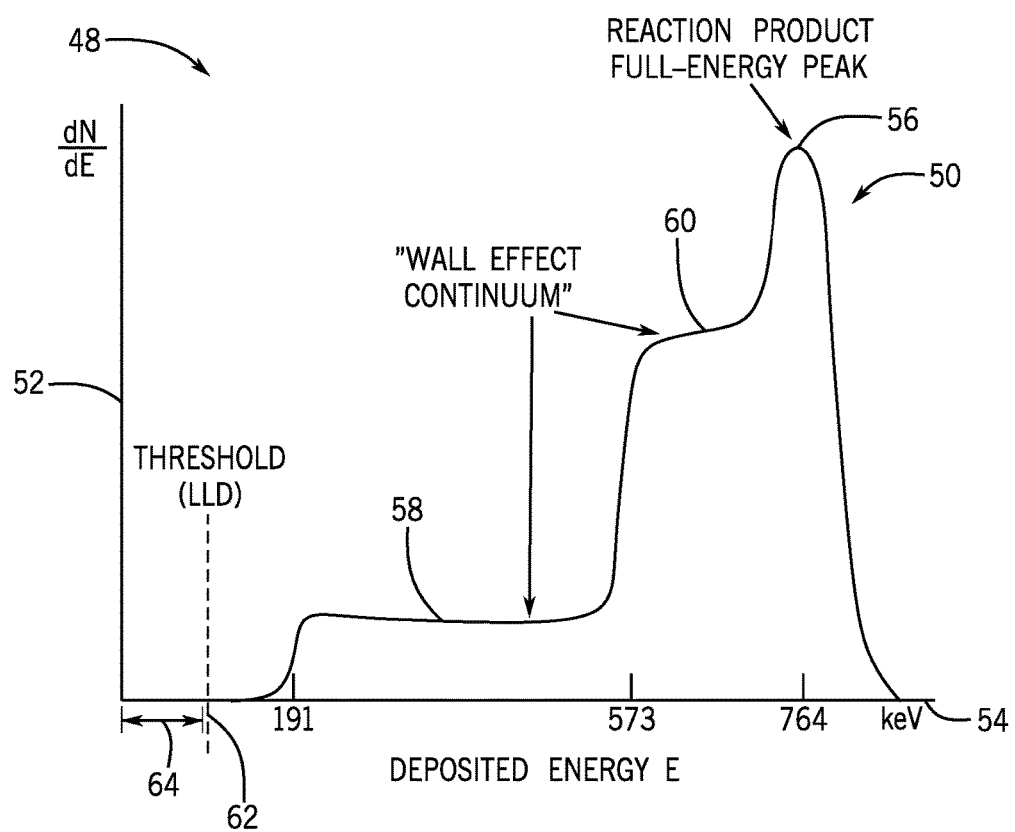
FIG. 3 is a graph of data from a read out of signal(s) received by the detection circuitry of FIG. 2, in accordance with an embodiment.

FIG. 3 is a graph 48 of an example of an energy spectrum 50 detected by the Helium-3 tube 44. The graph 48 shows a count rate of neutrons on a y-axis 52 with respect to deposited energy on an x-axis 54. The energy spectrum 50 may include a peak 56 that represents charges that are fully collected. Two continuums 58 and 60 may be found on the left side of the peak 56 due to incomplete charge collection. The continuums 58 and 60 may depend on the geometry of the Helium-3 tube 44. Due to a fixed geometry of certain Helium-3 tubes, the shape of the energy spectrum 50 may be fixed. Because the detector 42 is quite insensitive to gamma rays, the left side of the wall effect continuums 58 and 60 is also very clean with little background. In some embodiments, the data processing system 28 may compare the received energy to a threshold 62 or low level discriminator (LLD) between the left end of the continuums 58 and 60 and a right side at a lower energy level portion 64 to filter noise of the data.

Figure 4:
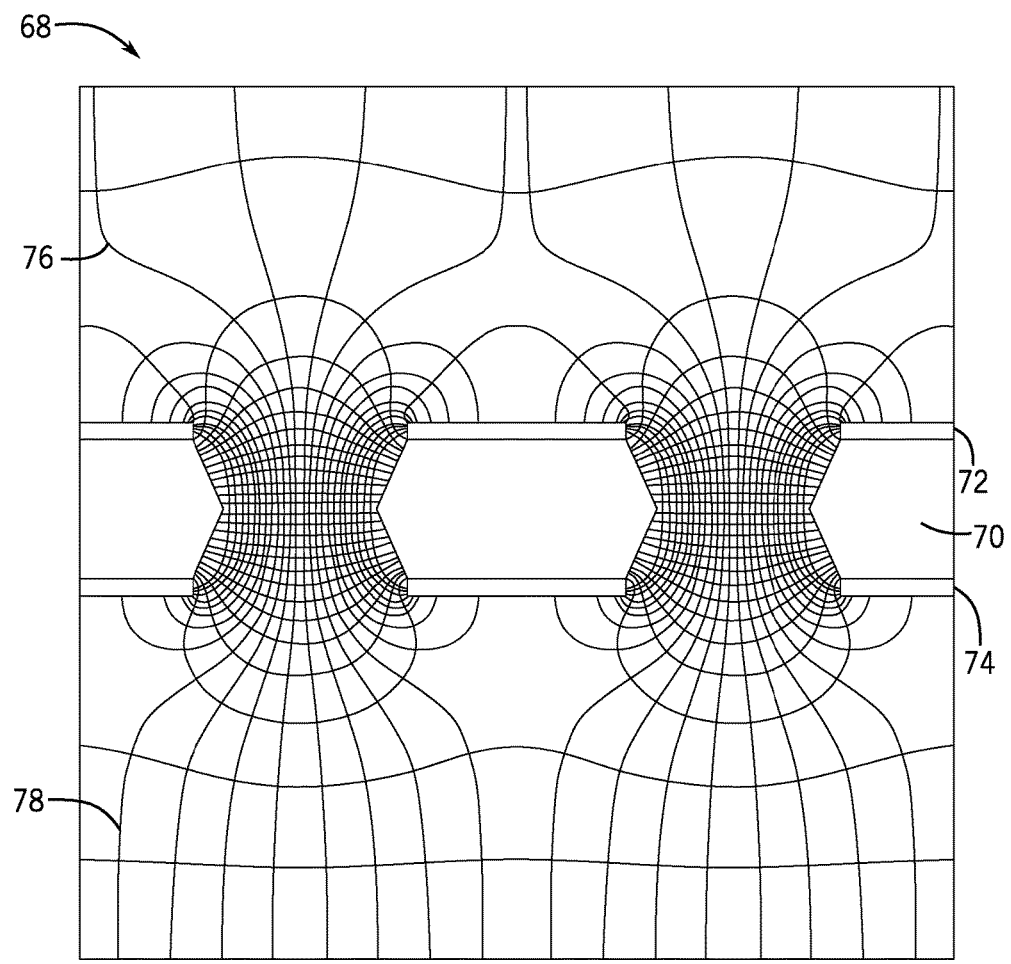
FIG. 4 is a schematic diagram of a gas electron multiplier (GEM) within the detector of FIG. 2, in accordance with an embodiment.

FIG. 4 is a schematic diagram of a gas electron multiplier (GEM) 68 that may be used in various embodiments of the Helium-3 tube 44 described below. The GEM 68 may include a mesh plate 70 that is made of a thin polymer foil, metal-coated on both sides, and pierced with a high density of holes (e.g., 50-100 holes/mm$^2$). A large difference of potential is applied between a first side 72 and a second side 74 of the mesh plate 70 to create an electric field in the holes. Electrons released in the upper region, such as electron 76, drift toward the holes of the mesh plate 70 and acquire sufficient energy to cause an electron avalanche in which multiple electrons 78 are emitted from each electron passing through the mesh plate 70. As described below, a Helium-3 tube may cause an electron avalanche, via the GEM 68 in the Helium-3 tube 44, to measure both epithermal neutrons and thermal neutrons.

Figure 5:
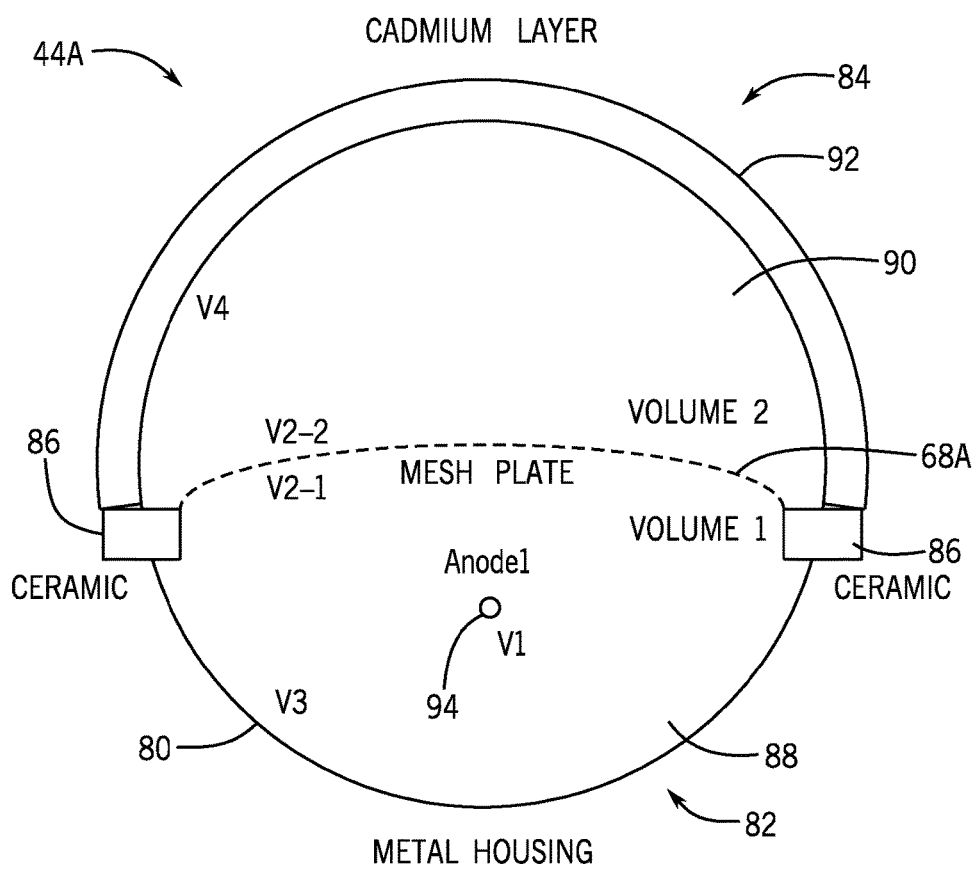
FIG. 5 is a cross-sectional view of the Helium-3 tube of FIG. 2 having a mesh plate of the GEM separate a first volume from a second volume, in accordance with an embodiment.

FIG. 5 is a cross-sectional view of the Helium-3 tube 44A of FIG. 2 that enables measurements of both epithermal neutrons and thermal neutrons in a single detector 42. The Helium-3 tube 44A includes a housing 80 made out of a material such as steel or another metal. While the Helium-3 tube 44A is shown as being cylindrical with a circular cross-section, any suitable shape may be used. The housing 80 includes a first side 82 and a second side 84 opposite the first side 82. The Helium-3 tube 44A includes ceramics 86 between the first side 82 and the second side 84 to provide electrical insulation and to separate the first side 82 from the second side 84.

The Helium-3 tube 44A includes a first volume 88 on the first side 82 and a second volume 90 on the second side 84. The first volume 88 and the second volume 90 are separated by the gas electron multiplier (GEM) 68A across a middle of the housing 80. The second side 84 of the housing 80 may be wrapped in a cadmium layer 92 to prevent thermal neutrons from entering from the second volume 90 from the second side 84.

Each volume 88 and 90 is filled with Helium-3 gas to a suitable pressure (e.g., 10 atm). Because thermal neutrons interact with the Helium-3 gas, thermal neutrons may not pass through the first volume 88. As a result, while the first volume 88 detects thermal neutrons, the first volume 88 shields thermal neutrons from entering the second volume 90 but allows epithermal neutrons to enter the second volume 90.

The Helium-3 tube 44A includes an anode 94 and the metal housing 80 as a cathode. The anode 94 may receive electrons caused by interaction between thermal neutrons and the Helium-3 gas in the first volume and electrons caused by interaction between epithermal neutrons and the Helium-3 gas in the second volume, and the anode may produce an output signal from the electrons received due to these interactions. The detection circuitry 46 may receive the output signal from the anode 94 and/or the cathode having a voltage and/or current indicating epithermal and thermal neutrons detected within the Helium-3 tube 44A. To detect both thermal and epithermal neutrons, different parts of the Helium-3 tube 44A may have certain voltage potentials with respect to the anode 94. As explained above, the thermal neutrons may be sensitive to the Helium-3 gas. The reaction described above produces ionized gas molecules of Helium-3 and creates electron and ion pairs. The electron and ion pairs drift to the anode 94 due to a cylindrically shaped electric field between the anode 94 and the metal housing 80 (i.e., cathode). If the electric field is strong enough (on the order of $10^6$ V/m), gas multiplication occurs. The anode 94 may have a voltage potential V1, the first side 82 of the metal housing 80 may have a voltage potential V3, and the second side 84 may have a voltage potential V4. The mesh plate 70 of the GEM 68A may have a voltage potential V2-1 and V2-2 between the first side 82 and the second side 84. A voltage difference between V2-1 and V2-2 determines the gain multiplication through the mesh plate 70 of the GEM 68A.

In some embodiments, the Helium-3 tube 44A may operate in a first mode (V1>V3 & V2-1 and V2-2<V4) in which the system detects thermal neutrons, but is relatively insensitive to epithermal neutrons because of the low epithermal neutron capture cross section. Although epithermal neutrons may interact in the second volume 90, the electrons from ionization do not enter the mesh plate 70 of the GEM 68A because V2-2 is less than V4. As a consequence, the events in the second volume 90 do not get amplified (e.g., second volume 90 is inactive). While the voltage relationships are given as an example, voltage potential differences may depend on the geometry and gain requirements of the downhole tool 12.

The Helium-3 tube 44A may operate in a second mode (V1>V3, V1>V2, and V2-1>V2-2>V4) in which both the first volume 88 and the second volume 90 are active. The first volume 88 operates as a proportional counter of thermal neutrons. While the thermal neutrons are sensitive to the Helium-3 gas, epithermal neutrons may pass through the mesh plate 70 of the GEM 68A. In the second volume 90, the electrons, which are created by the charge particle ionization after epithermal neutron conversion, drift to the mesh plate 70 of the GEM 68A.

Figure 6:
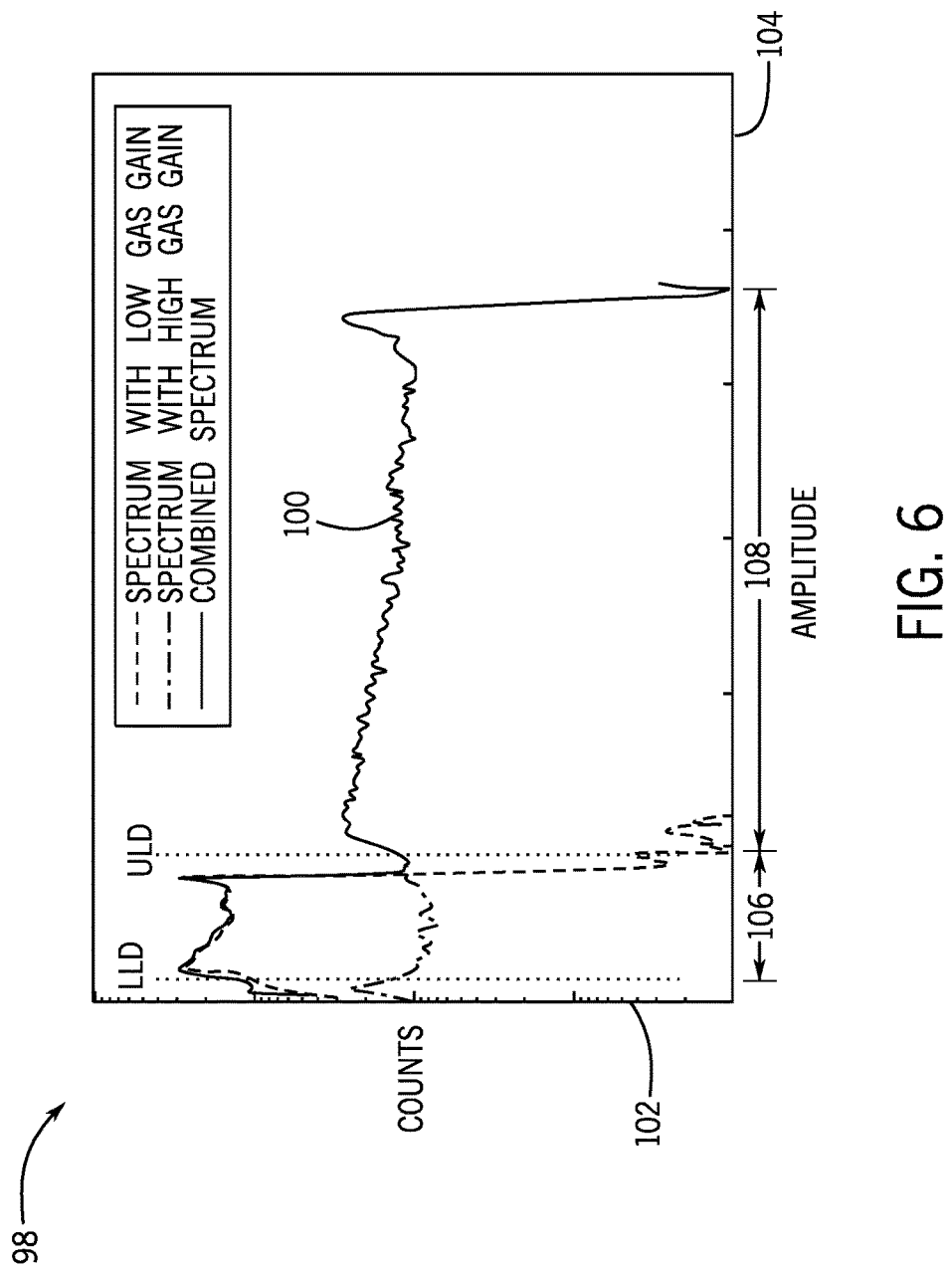
FIG. 6 is a graph of data from a single readout of signal(s) received by the detection circuitry of FIG. 2, in accordance with an embodiment.

FIG. 6 is a graph 98 of data from a single readout of signal(s) received by the detection circuitry 46 received from the anode 94. The graph 98 shows the combined spectrum 100 of a number of counts of epithermal neutrons and thermal neutrons on the y-axis 102 with respect to amplitude on the x-axis 104. If the amplitude of the voltages V1, V2-1, V2-2, V3, and V4 are arranged properly, the gas gain of thermal neutron events can fall into a low count rate region of the spectrum of epithermal neutron events. Thermal neutron events may refer to occasions in which the detection circuitry 46 receives signal(s) from electrons indicating reactions from thermal neutrons. Epithermal neutron events may refer to occasions in which the detection circuitry 46 receives signal(s) from electrons indicating reactions from epithermal neutrons. The detection circuitry 46 may provide a count rate of thermal neutrons having a signal amplitude 106 between a low level discriminator (LLD) and an upper level discriminator (ULD). The detection circuitry 46 may provide a count rate of epithermal neutrons having signal amplitude 108 above the upper level discriminator. Because the spectrum 100 includes the thermal neutron and epithermal neutron detection, the detection circuitry 46 may perform a single readout indicative of both thermal neutrons and epithermal neutrons, which may be distinguished from each other via the LLD and ULD.

For the epithermal neutron parts of the spectrum 100, the count rate may have a relatively clean background due to the high gain from the GEM 68. For thermal neutrons, the background may be slightly higher due to a contribution of the epithermal neutrons present in the first volume 88. In some embodiments, the detector 42 may switch to the first mode of operation to remove overlap between the spectrum caused by epithermal neutrons to acquire a thermal neutron measurement.

The GEM 68 may further provide confirmation of discrimination between the epithermal neutrons and the thermal neutrons. In some embodiments, in the electron avalanche, some electrons may pass through the mesh plate 70, and other electrons may stay with the mesh plate 70. The detection circuitry 46 may be electrically coupled to the GEM 68 such that the detection circuitry 46 may read out signal(s) from the electron avalanche. For instance, the detection circuitry 46 may distinguish between epithermal neutrons and thermal neutrons based on whether the read out of the mesh plate 70 and the anode 94 are coincident (e.g., both anode 94 and mesh plate 70 receiving electrons) or anti-coincident (e.g., anode 94 receiving electrons but not the mesh plate 70). That is, if the detection circuitry 46 performs a read out of the mesh plate 70 of the GEM 68 during the read out of the anode 94, then the detection circuitry 46 may confirm that the read out of the anode 94 includes an epithermal neutron event.

Further, the detection circuitry 46 may utilize a pulse shape difference to distinguish between epithermal neutron events and thermal neutron events, referred to as pulse shape discrimination. That is, the detection circuitry 46 may associate decreases or increases in counts at certain locations of the spectrum 100 as an indication of epithermal neutrons due to the gas gain of the GEM 68.

Figure 7:
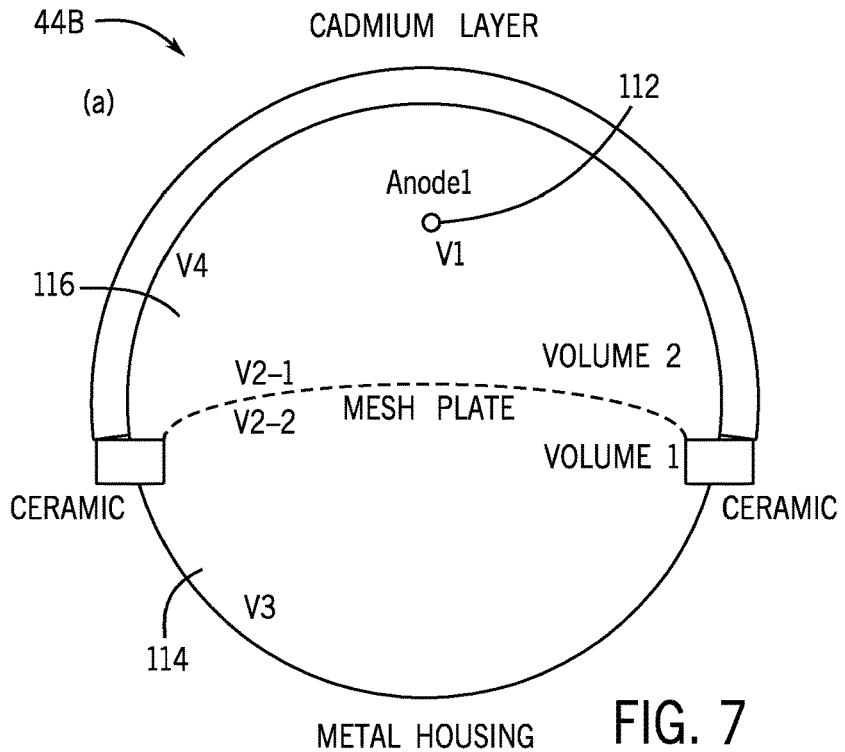
FIGS. 7-11 are cross-sectional views of the Helium-3 tube of FIG. 2 having the mesh plate separate a first volume from a second volume, in accordance with an embodiment.

FIG. 7 is another embodiments of the Helium-3 tube 44B having a first volume 114 and second volume 116. The second volume 116 includes an anode 112. The thermal neutrons may have more gas gain, which means that the background for epithermal neutron events is higher.

Figure 8:
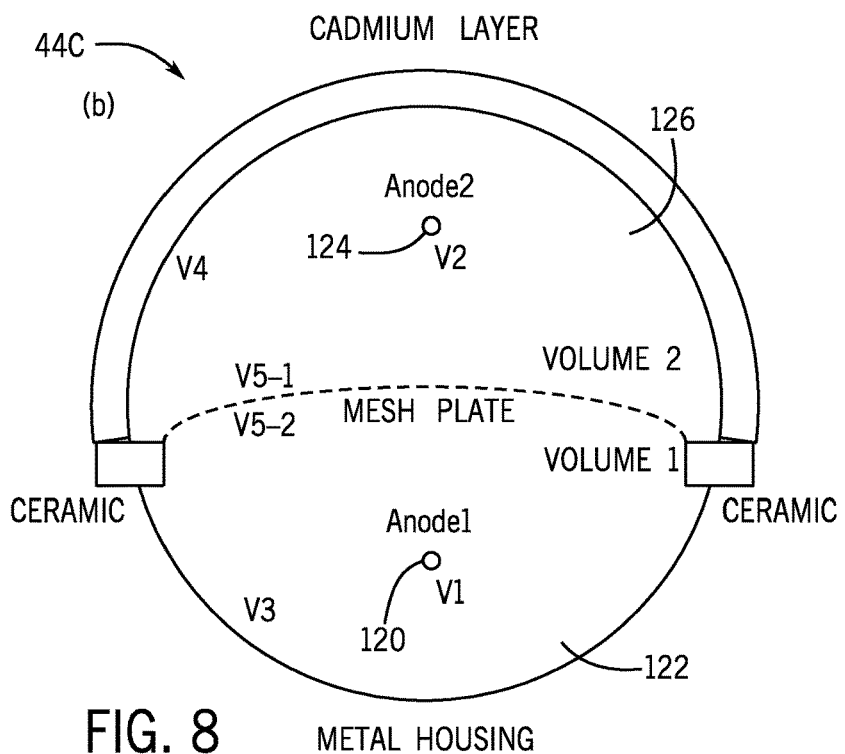

FIG. 8 is another embodiment of the Helium-3 tube 44C having a first anode 120 in a first volume 122 and a second anode 124 in a second volume 126. In the illustrated embodiment, the detection circuitry 46 may switch between detection of thermal neutrons in the first volume (without detection of epithermal neutrons), epithermal neutrons in the second volume (without detection of thermal neutrons), and dual detection of both thermal neutrons and epithermal neutrons using pulse shape discrimination. For example, the detection circuitry 46 may apply voltages in the Helium-3 tube 44C such that V1>V3, V1>V5-2, V4>V2, and V4>V5-1 to detect thermal neutrons. The detection circuitry 46 may then apply voltages in the Helium-3 tube 44C such that V2>V4, V2>V5-1, V3>V1, and V3>V5-2 to detect epithermal neutrons. To detect both thermal neutrons and epithermal neutrons, the embodiment may use voltages similar to those described with respect to FIG. 6.

Figure 9:
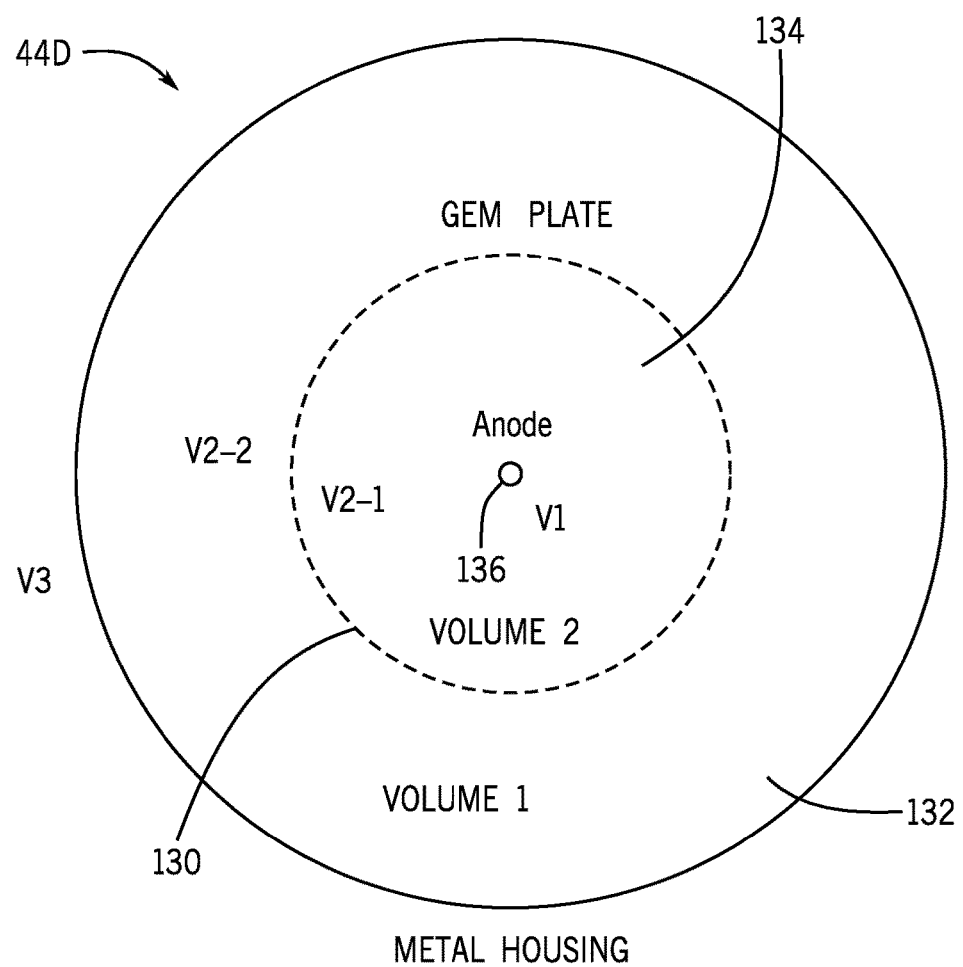

FIG. 9 is another embodiment of the Helium-3 tube 44D having a cylindrical mesh plate 130 between an annular volume 132 and a cylindrical volume 134. With the gas gain from the mesh plate 130, the thermal neutron events may have larger gain and epithermal neutron events may have a lower gas gain as compared to the gas gain of the thermal neutron events. The detector may switch between epithermal neutron mode (V1>V3>V2) and dual measurement mode (V1>V2>V3). A cylindrical mesh plate 130 may provide a uniform gas gain on the anode 136 due to the uniform geometry of the Helium-3 tube 44D.

Figure 10:
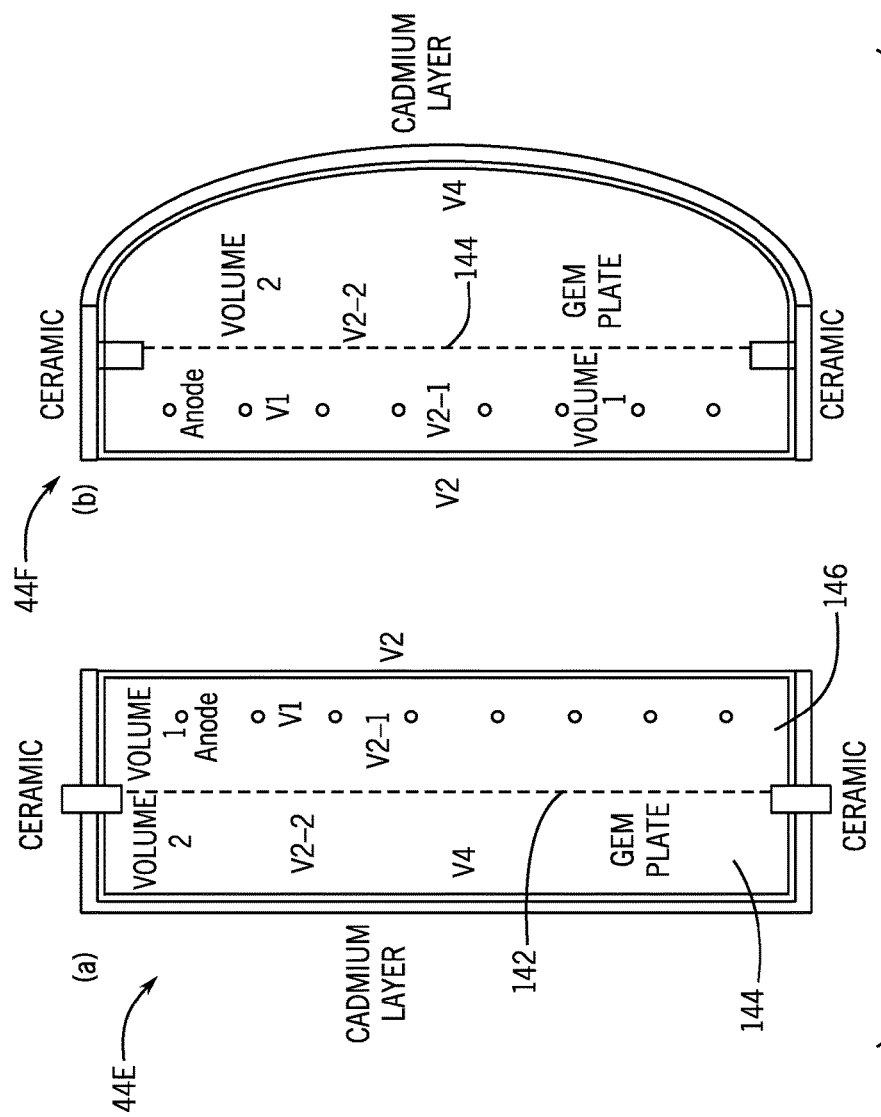

In the examples above, one or two anodes are used to be illustrative. However, any suitable number of anodes may be used to manipulate gas gain to differentiate neutron types and to provide position information of the thermal neutron events and/or epithermal neutron events. FIG. 10 shows a cross-sectional view of two embodiments of the Helium-3 tubes 44E and 44F. Each of the Helium-3 tubes 44E and 44F may operate in a similar principle as those described above. That is, the mesh plate 142 may separate the Helium-3 tube 44E into a first volume 144 and second volume 146 to detect epithermal neutrons and thermal neutrons. With multiple anodes, the count rate capability of the detector may be improved. Further, additional anodes may provide additional flexibility in detector geometry and to save space within the downhole tool 12. While the embodiments may show certain geometries and locations of the anodes, note that any suitable geometry or configuration suitable may be used.

Figure 11:
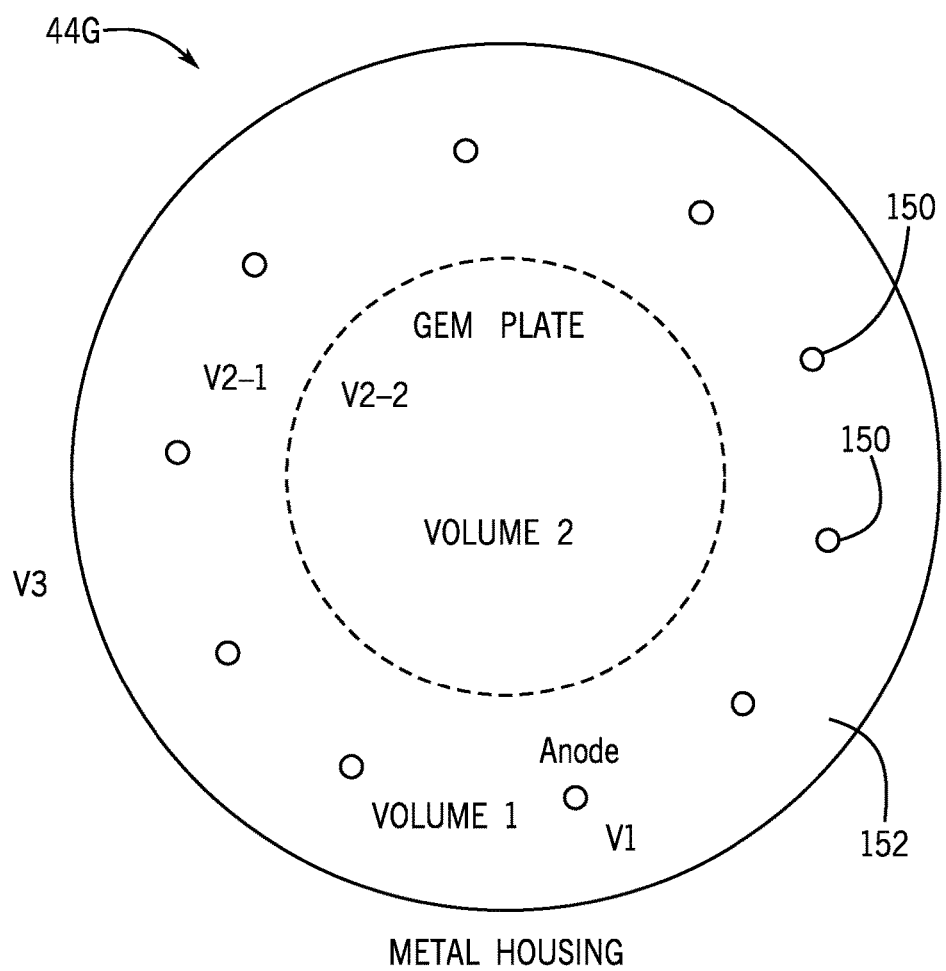

FIG. 11 shows a cross-sectional view of an embodiment of another example of the Helium-3 tube 44G. The Helium-3 tube 44G may include multiple anodes 150 in the first volume 152. By using a cylindrical shape of the mesh plate 70, the cadmium layer may be eliminated. Further, by including multiple anodes 150, the Helium-3 tube 44G may provide positional information of the epithermal neutron events and the thermal neutron events. By using multiple anodes at different positions, precision of determined characteristics of the geological formation 14 may be improved. That is, the detection circuitry may detect position information of thermal and epithermal neutrons based on locations of the multiple anodes 150.

Figure 12:
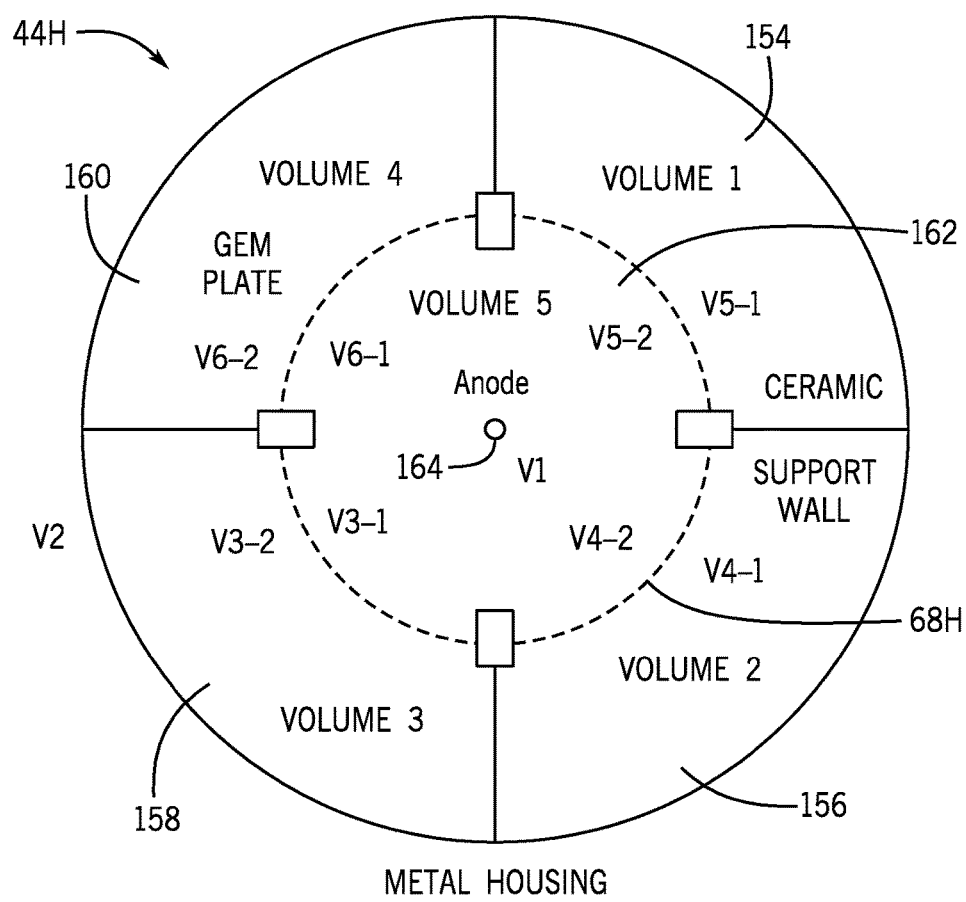
FIG. 12 is a cross-sectional view of the Helium-3 tube of FIG. 2 having the mesh plate separate a volume from other volumes to enable positional information to be detected by the detector, in accordance with an embodiment.

While some of the examples above use multiple anodes to determine position sensitive information, in other embodiments, multiple volumes may be used to provide position sensitive information. FIG. 12 is another example of a Helium-3 tube 44H having multiple volumes 154, 156, 158, 160 separated, via a mesh plate 68H, from a central volume 162 having an anode 164. Each of the volumes 154, 156, 158, and 160 may be activated by increasing voltages across the mesh plates 68H while reducing or removing voltages of deactivated volumes. In this manner, the detection circuitry 46 may iterate to control voltages of each volume 154, 156, 158, and 160 to determine neutrons entering each volume, thereby enabling the detection circuitry 46 to obtain positional information of the incoming neutron distribution. To increase efficiency, multiple volumes 154, 156, 158, and 160 may be activated simultaneously and distinguished based on the gain of the mesh plate. While four volumes 154, 156, 158, and 160 are segmented in the illustrated embodiment, any suitable number of volumes may be used.

Figure 13:
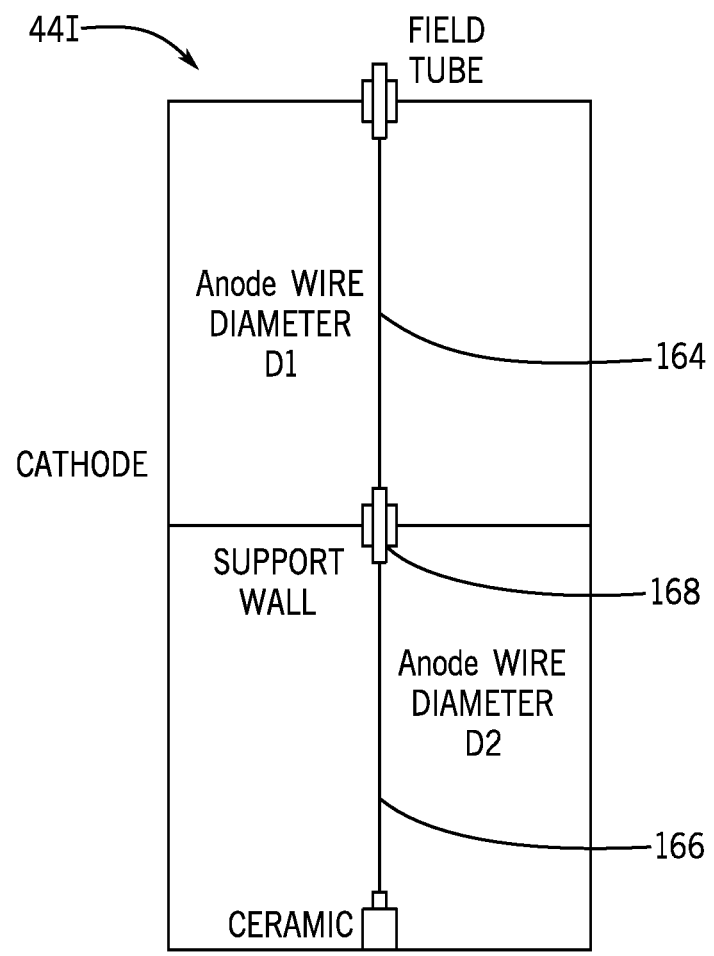
FIG. 13 is a cross-sectional view of the Helium-3 tube of FIG. 2 that obtains axial position information by manipulating gas gain in different axial locations of the Helium-3 tube.

Axial position information may be obtained by delay lines or resistive wire (e.g., carbon fiber). FIG. 13 shows an example of a Helium-3 tube 44I that obtains axial position information by manipulating gas gain in different axial locations. In each section, the anode wire 164 and 166 has a unique diameter, and the anode wires 164 and 166 share a field tube 168 in the middle of the device. The same voltage is applied to the two anodes 164 and 166. Because of the different diameters, the electrical field strength in each section is different. Consequently, the gas gain may be different. By controlling the wire diameter and the gas gain, the signal from different sections of the device can overlap without much interference on the spectra. Thus, by a single readout, the detection circuitry 46 may obtain position information associated with each section. This position discrimination by gain is possible with a clean Helium-3 spectrum.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The invention claimed is:

1. A detector configured to detect properties of a geological formation, the detector comprising:
   a first volume and a second volume each comprising Helium-3 gas;
   a gas electron multiplier having a mesh plate disposed between the first volume and the second volume, wherein the mesh plate is configured to create an electric field that multiplies electrons of the second volume based on epithermal neutrons in the second volume; and
   at least one anode configured to receive electrons caused by interaction between thermal neutrons and the Helium-3 gas in the first volume and electrons caused by interaction between epithermal neutrons and the Helium-3 gas in the second volume to produce an output signal.

2. The detector of claim 1, wherein the second volume is shielded from thermal neutrons via a cadmium layer and the Helium-3 gas of the first volume.

3. The detector of claim 1, wherein the second volume is shielded from thermal neutrons on a first side of the second volume via the first volume and shielded from thermal neutrons on a second side of the second volume via the cadmium layer, wherein the second side is opposite the first side.

4. The detector of claim 1, wherein the detector comprises detection circuitry configured to perform a single readout of the output signal indicative of both epithermal neutrons and thermal neutrons.

5. The detector of claim 4, wherein the detection circuitry is configured to distinguish a count rate of epithermal neutrons from a count rate of thermal neutrons.

6. The detector of claim 1, wherein the at least one anode comprises a first anode in the first volume.

7. The detector of claim 6, wherein the at least one anode comprises a second anode in the first volume, wherein detection circuitry is configured to detect position information of thermal and epithermal neutrons based on locations of the first anode and the second anode.

8. The detector of claim 1, wherein the detector comprises a cylindrical metal housing as a cathode, and wherein the first volume comprises a cylindrical volume within the cylindrical metal housing.

9. The detector of claim 1, comprising a metal housing that has a first side having a first voltage and a second side having a second voltage different from the first voltage.

10. The detector of claim 9, wherein the first side and the second side are separated by a ceramic material between the first side and the second side.

11. The detector of claim 1, wherein the gas electron multiplier is configured to provide a signal based on coincidence in which some electron contact the mesh plate indicating an occurrence of epithermal neutrons in the second volume.

12. The detector of claim 1, wherein detection circuitry is configured to control voltages of the detector with respect to the at least one anode to guide electrons to the at least one anode.

13. A method, comprising:
    separating a first volume of a detector from a second volume of the detector via mesh plate of a gas electron multiplier, the mesh plate being disposed between the first volume and the second volume, wherein the mesh plate is configured to create an electric field that multiplies electrons of the second volume based on epithermal neutrons in the second volume; and
    filling a first volume and a second volume with Helium-3.

14. The method of claim 13, comprising setting a low level discriminator and an upper level discriminator to distinguish between thermal neutrons and epithermal neutrons.

15. The method of claim 14, comprising separating a first side of the detector and a second side of the detector via ceramics.

16. The method of claim 13, comprising electrically coupling the mesh plate to detection circuitry to enable the detection circuitry to distinguish between epithermal neutrons and thermal neutrons based at least in part on a coincidence of the mesh plate.

17. A downhole tool, comprising:
a detector comprising:
a first volume and a second volume each comprising Helium-3 gas;
a gas electron multiplier having a mesh plate disposed between the first volume and the second volume, wherein the mesh plate is configured to create an electric field that multiplies electrons of the second volume based on epithermal neutrons in the second volume; and
at least one anode configured to receive electrons based on thermal neutrons in the first volume and epithermal neutrons in the second volume; and
detection circuitry configured to receive an electrical signal via the anode indicative of the electrons.

18. The downhole tool of claim 17, wherein the detection circuitry is configured to distinguish between epithermal neutrons and thermal neutrons based at least in part on a low level discriminator and an upper level discriminator.

19. The downhole tool of claim 17, wherein the detection circuitry is configured to distinguish between epithermal neutrons and thermal neutrons based at least in part on a coincidence of the mesh plate.

20. The downhole tool of claim 17, wherein a first side and a second side of a metal housing of the detector are separated by ceramics.

* * * * *